United States Patent [19]

Guyer

[11] Patent Number: 4,814,719
[45] Date of Patent: Mar. 21, 1989

[54] UNSYMMETRICAL QPSK DEMODULATOR

[75] Inventor: Edward Guyer, Cupertino, Calif.

[73] Assignee: Ford Aerospace & Communications Corporation, Detroit, Mich.

[21] Appl. No.: 133,102

[22] Filed: Dec. 14, 1987

[51] Int. Cl.[4] .......................................... H04L 27/22
[52] U.S. Cl. ................................... 329/124; 331/4; 331/12; 331/DIG. 2; 375/81; 375/83; 375/120
[58] Field of Search .................... 329/50, 122, 124; 375/81, 83, 84, 120; 331/4, 12, DIG. 2

[56] References Cited

U.S. PATENT DOCUMENTS

| 4,027,265 | 5/1977 | Kobayashi et al. | 329/122 |
|---|---|---|---|
| 4,079,329 | 3/1978 | England et al. | 329/50 |
| 4,085,378 | 4/1978 | Ryan et al. | 329/124 |
| 4,092,606 | 5/1978 | Ryan | 329/124 |
| 4,344,178 | 8/1982 | Waters | 375/81 |
| 4,559,499 | 12/1985 | Bursztejn et al. | 329/50 |
| 4,581,586 | 4/1986 | Rubin | 329/50 |
| 4,713,630 | 12/1987 | Matthews | 329/124 X |

Primary Examiner—Siegfried H. Grimm
Attorney, Agent, or Firm—Edward J. Radlo; Keith L. Zerschling

[57] ABSTRACT

The present invention is a demodulator for demodulating an unsymmetrical QPSK signal (1), i.e., one in which the amplitudes of the I and Q channels are different, and the I and Q channels have been modulated by signals having differnt bit rates. Analog versions of the I and Q modulating baseband signals are first extracted from the carrier. Each baseband signal is then subjected to a bit-rate-matched low pass filter (23, 13). The channel having the higher bit rate is subjected to a delay (32) to time-align the two baseband signals. The time-aligned filtered signals are then amplified by amplifiers (22, 12) having unequal gains that are preselected to substantially equalize the amplifier (22, 12) outputs. The amplified time-aligned filtered signals are then subjected to a phase error (E) generating means (15, 25, 16, 26, 34). The phase error (E) is passed through a loop integrator (38) and a VCO (30) and back to the baseband signal extracting means to complete a phase lock loop. Frequency searching means (40), frequency lock detect means (42, 44), and AGC control (46, 8) are optionally present.

5 Claims, 2 Drawing Sheets

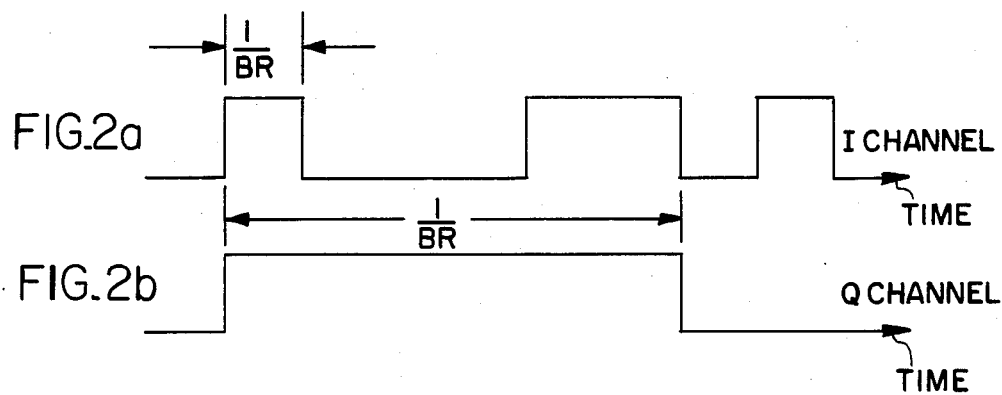
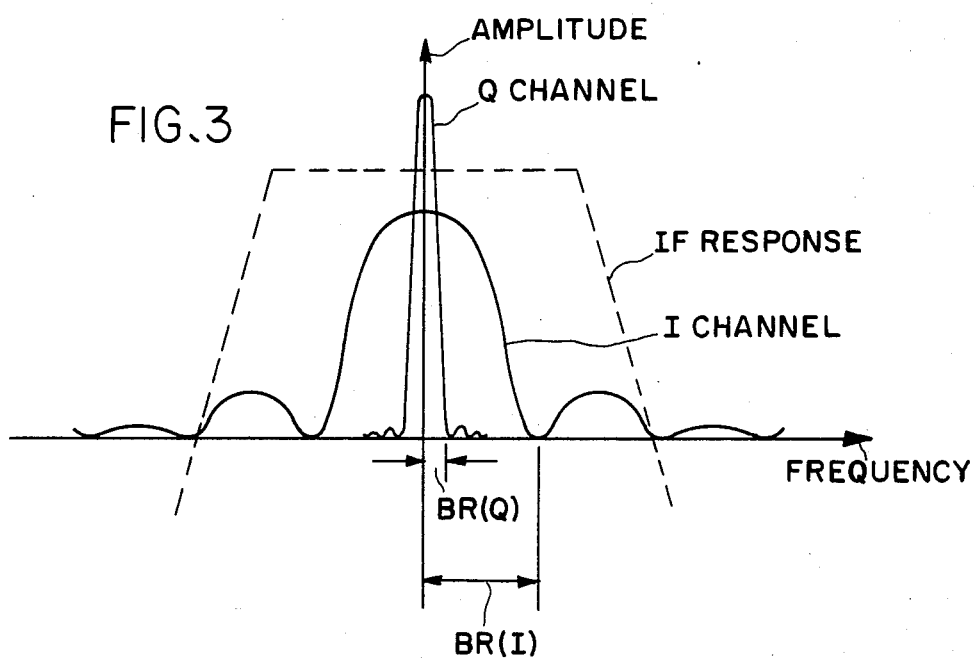
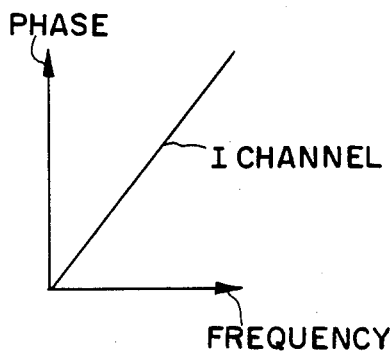
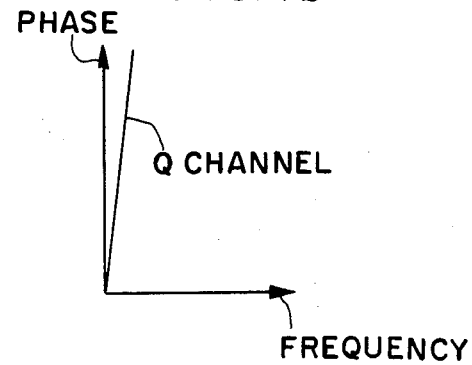

UNSYMMETRICAL QPSK DEMODULATOR

The invention described herein was made in the performance of work under NASA contract number NAS5-29500 and is subject to the provisions of Section 05 of the National Aeronautics and Space Act of 1958, as amended (72 Stat. 435; 42 U.S.C. 2457).

TECHNICAL FIELD

This invention pertains to the field of demodulating a QPSK (Quadrature Phase Shift Keyed) signal that is unsymmetrical. As used in the instant specification and claims, "unsymmetrical" means that the amplitudes of the I and Q channels are different, and the I and Q channels have been modulated by signals having different bit rates.

BACKGROUND ART

U.S. Pat. No. 4,027,265 discloses a QPSK demodulator for "unbalanced" but not unsymmetrical signals. "Unbalanced" in the reference means that the amounts f phase shift indicating data bits are not multiples of 90°.

The reference device, which is more complex than the instant device, reconstructs the reference carrier by attempting to correlate with phasors of the received signal. This is accomplished by separate dual correlators 58,62 whose outputs ultimately control the frequency/phase of VCO 88. Another set of dual correlators 38,48 recovers data streams 1 and 2.

By contrast, the present invention requires only one set of dual correlators (11,21) to capture the I and Q components of the signal "phasor". Each component then yields a data stream, the raw I and Q data, respectively. Filtering the channels in bit rate matched filters (13,23) followed by time alignment (32) and unequal amplification (at 12,22) produces a phase error signal which facilitates recovery of the VCO (30) control signal.

U.S. Pat. No. 4,079,329 discloses a digital demodulator for recovering a baseband signal from a selectable bit rate PSK modulated signal that is not unsymmetrical.

The reference device requires data synchronization simultaneously with, or prior to, carrier synchronization. This is different and more complex than in the present invention.

U.S. Pat. No. 4,085,378 discloses a QPSK demodulator in which the inphase and quadraphase channels are independently cross-coupled to minimize crosstalk.

U.S. Pat. No. 4,092,606 discloses a QPSK signal demodulator using a phase lock loop including a variable frequency coherent reference that is dithered at a low rate to derive a relatively low level tracking error phase for the lock loop.

U.S. Pat. No. 4,344,178 discloses a QPSK demodulator which uses a sample and hold detector in the phase detection circuit, which presupposes simultaneous synchronization (clock recovery) of data and carrier.

U.S. Pat. No. 4,559,499 discloses an AGC circuit for a symmetrical QPSK demodulator. It does not disclose the time alignment means 32, optimal (bit-rate-matched) filters 13,23, or unequal-gain amplifiers 12,22 of the present invention.

U.S. Pat. No. 4,581,586 discloses a QPSK demodulator in which the I channel data are first recovered, and then the Q channel data are recovered.

DISCLOSURE OF INVENTION

The present invention is a demodulator for demodulating an unsymmetrical QPSK signal (1). The signal (1) comprises I and Q baseband analog signals modulated onto two phase components of a common carrier. The I and Q channel components are 90° out of phase. The demodulator comprises means (10,20,11,21) for extracting the I and Q baseband analog signals from the carrier. Coupled to the extracting means is a pair of bit-rate-matched low pass filters (23,13) for filtering the I and Q baseband analog signals, respectively. Coupled to the low pass filter for the channel having the higher modulating bit rate is a delay means (32) for time-aligning the two filtered baseband analog signals. Coupled to the time-aligned filtered baseband analog signals is a pair of amplifiers (22,12) for amplifying the two time-aligned filtered baseband analog signals, respectively. The amplifiers (22,12) have different gains that are preselected to substantially equalize the amplitudes at the respective amplifier (22,12) outputs. Coupled to the outputs of the two amplifiers (22,12) is a phase error generating means (15, 25, 16, 26, 34) which generates a phase error E that is coupled to an input of a VCO (30) in phase lock loop arrangement. The VCO (30) has an output that is fed to the extracting means.

BRIEF DESCRIPTION OF THE DRAWINGS

These and other more detailed and specific objects and features of the present invention are more fully disclosed in the following specification, reference being had to the accompanying drawings, in which:

FIG. 2a and 2b show exemplary time domain waveforms for the digital versions of the modulating signals for the I channel and the Q channel, respectively;

FIG. 3 shows frequency domain (spectrum) versions of the modulating signals depicted in FIG. 2; and FIGS. 4a and 4b show the relative phase vs. frequency responses for the signal filtering low pass filters 23,13, respectively.

BEST MODE FOR CARRYING OUT THE INVENTION

Figure 1:
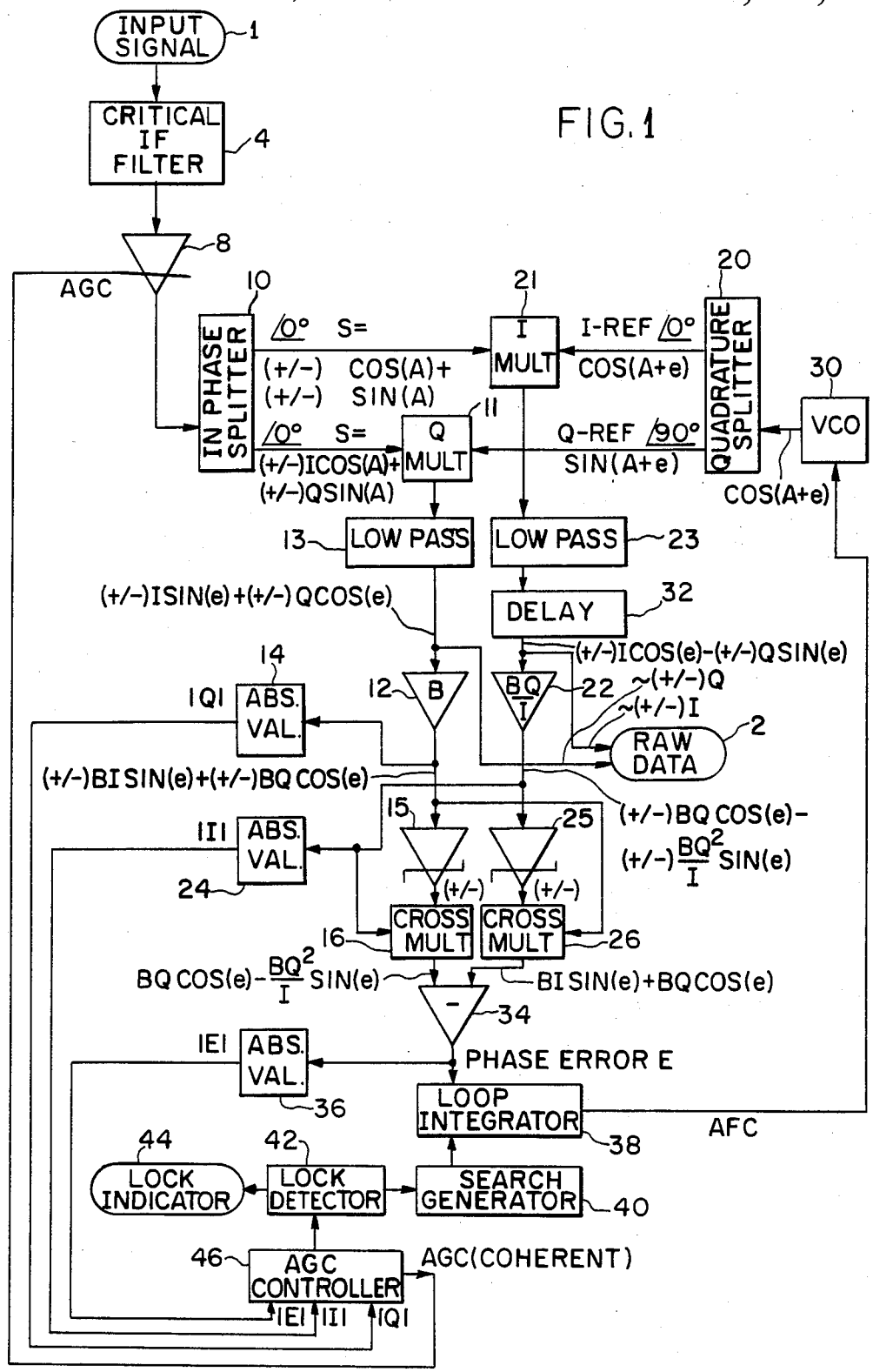
FIG. 1 is a block diagram of a preferred embodiment of the present invention.

Often in QPSK it is desired to send the signal 1 with different amplitudes for the I and Q subcarriers (channels), and for the I and Q modulating signals to have different bit rates. For example, a relatively high amplitude, high bit rate signal could be associated with video information while a relatively low amplitude, low bit rate signal could be associated with audio information. Similarly, a relatively high amplitude, high bit rate signal could be associated with audio information while a relatively low amplitude, low bit rate signal could be associated with satellite telemetry information.

In the present invention, the relatively high amplitude, high bit rate signal is arbitrarily assigned to the I channel. The I and Q channels are in quadrature (separated in phase by 90°). Each channel has been biphase modulated by an individual data stream as illustrated in FIGS. 2a and 2b. The modulating functions are herein referred to as (+/−)I and (+/−)Q, respectively. These functions can have values of +I and −I, and +Q or −Q, respectively. The two data streams have different, unrelated bit rates as indicated in the Figure.

It is assumed that the carrier IF frequency f is significantly higher than the bit rate of even the faster (I) channel, e.g., f is at least 10 times the I-channel bit rate.

Turning to FIG. 1, it is assumed that the input signal 1 is at a suitable IF frequency. The IF frequency is selected to accommodate the required bit rate of the input signal 1 with implementable filter 4 designs, taking into account ease of circuit realization. The input signal 1 passes through critical IF filter 4. "Critical" means that the filter 4 is matched to the bit rate of the faster bit rate channel, i.e., the I channel. This is most readily seen in FIG. 3, which depicts frequency domain versions of the I channel and Q channel IF components modulated by signals of FIG. 2. The amplitude in the frequency domain of each modulating signal has the form $\sin(x)/x$, where x is the frequency. The signals depicted in FIG. 3 have the form $\sin^2(x)/x^2$ because they represent power rather than amplitude. The bandwidth of filter 4 customarily covers the main lobe and first sidelobes of the frequency signature of the higher bit rate channel (I channel). It is seen that the frequency passband of IF filter 4 is thus wide enough to encompass four bit rates of the I channel (4BR(I)). This has been found to be an optimum tradeoff for filtering out noise while not truncating the desired signal excessively.

Again with reference to FIG. 1, the filtered signal 1 is then passed through an AGC'd amplifier 8, which normalizes the signal 1 into inphase splitter (power hybrid) 10. The splitter 10 divides the signal 1 into two portions of equal amplitude and phase. The phase angle is arbitrarily defined to be zero degrees on FIG. 1. Each of the split signals is designated as $S=(+/-)I\cos(A)+(+/-)Q\sin(A)$, in other words, the sum of the I channel and the Q channel components. The trigonometric argument "A" is defined to be $2\pi i(f)(t)$, where $pi=3.14159...$, f is the carrier frequency, and t is time.

As a mathematical simplification in analyzing the invention, it is assumed that the $(+/-)I$ and $(+/-)Q$ modulating functions are not band-limited, i.e., they go from plus to minus (and minus to plus) in zero time. No assumptions are made about the timing of the $(+/-)I$ and $(+/-)Q$ modulating functions. The analysis of the invention, therefore, is valid for unstaggered and staggered QPSK, and also for different timing, including asynchronous timing, of the data streams in the two channels. In the mathematical analysis of the circuit, we neglect the effects of corruption of actual signals due to spectrum truncation by filter 4 or by the link, signal limiting, inaccurate quadrature, modulation unbalance, noise, etc.

The upper branch signal S goes to I multiplier 21, and the lower branch signal S goes to Q multiplier 11. Multipliers 11,21 are typically double-balanced mixers.

A local oscillator signal emanates from VCO 30 and has the form $\cos(A+e)$, where e is a phase error. This local oscillator signal is split by quadrature splitter (power hybrid) 20 into two branches having equal amplitude, but 90° out of phase. The upper branch is designated I-REF and equals $\cos(A+e)$. The lower branch is designated Q-REF and equals $\sin(A+e)$.

In I multiplier 21, signal S is multiplied with I-REF and the output (using trigonometric identities) is the product:

$$(\tfrac{1}{2})[(+/-)I(\cos(-e)+\cos(2A+e))+(+/-)Q(\sin(-e)+\sin(2A+e))].$$

Since it is assumed that the frequency f is much higher than the bit rate of the I channel, the terms containing 2A in the above expression are filtered out by low pass filter 23. The constant "$\tfrac{1}{2}$" can also be disregarded in the mathematical analysis because it is only a scaling factor. As shown on FIG. 1, the output of delay 32 (which is the filtered I product) thus becomes (keeping in mind that cosine is an even function and sine is an odd function):

$$(+/-)I\cos(e)-(+/-)Q\sin(e).$$

Similarly, the output of low pass filter 13 (which is the filtered Q product) has the form:

$$(+/-)I\sin(e)+(+/-)Q\cos(e).$$

e is very small because it is proportional to the phase error E in the phase lock loop (comprising items 30,20,11,21,12,22,13,23,32,15,25,16,26,34, and 38), which is assumed to be in lock or approaching lock. As e approaches zero, the sin(e) terms in the above expressions approach zero and the cos(e) terms approach one. What we are left with, therefore, is the filtered I product approaching $(+/-)I$ and the filtered Q product approaching $(+/-)Q$. Therefore, a convenient place to extract the raw data from the I and Q channels is right before the action of amplifiers 12,22. The I and Q raw data 2 can be passed to suitable synchronizers (not shown).

Filters 13,23 are bit-rate-matched: each of low pass filters 13,23 has a bandwidth of approximately 80% of the corresponding bit rate, to optimize the signal-to-noise ratio. Since filter 13 corresponds to the channel with the lower bit rate, it has a smaller bandwidth (is narrower) than filter 23. FIG. 4a sketches the phase vs. frequency function of I-channel filter 23 and FIG. 4b sketches the phase vs. frequency function of Q-channel filter 13. In any analog filter, delay equals dP/dx, where P is the phase and x is the frequency. Thus, the steeper phase vs. frequency curve of the narrower filter 13 produces a longer time delay (group delay). It is required to intentionally re-align the signals in time by the inclusion of delay 32, e.g., a delay line, which is inserted after filter 23 in the I channel.

Amplifiers 12,22 then operate on the time-aligned filtered baseband signals.

The gain of amplifier 12 (the Q channel baseband amplifier) is arbitrarily selected to have a value B.

The gain of amplifier 22 (the I channel baseband amplifier) is intentionally selected to be equal to BQ/I. By this technique, the amplitudes at the outputs of amplifiers 12 and 22 are made nearly equal, as indicated on FIG. 1, because the sine terms approach zero as e approaches zero. This is desirable for the proper functioning of the remaining portions of the phase lock loop. i.e., generation of phase error E.

Amplifiers 12,22 are selected to have bandwidths corresponding to the baseband of the higher bit rate, namely 2BR(I). Amplifiers 12,22 are depicted as being inserted after filters 13,23, but, alternatively, they could be inserted before said filters 13,23.

The remaining circuitry produces the phase error signal E for the phase lock loop, and absolute values of signals of interest for AGC controller 46. Sign detectors 15,25, which may be conventional threshold detectors, are voltage comparators each having a decision voltage at zero volts. They detect the polarity (sign) of the signals that are fed at their inputs. Since the sine terms approach zero and the cosine terms approach one as the error value e approaches zero, the detected sign value at the output of each detector 15,25 is the (+/−) coefficient of the cosine term of the input. These (+/−) values are fed, respectively, to cross multipliers 16,26, which are capable of operating down to d.c.

A second input to cross multiplier 16 is the filtered and amplified product signal from the I channel. A second input to cross multiplier 26 is the filtered and amplified product signal from the Q channel. The resulting output from multiplier 16 is a signal of the form BQcos(e)−BQ$^2$/Isin(e). The output from multiplier 26 is a signal of the form BIsin(e)+BQcos(e).

The outputs from cross multipliers 16,26 are fed as the two inputs into subtractor 34, which subtracts the multiplier 26 output from the multiplier 16 output, and yields as its output a phase error signal E=-B(Q$^2$/I+I)-sin(e). In subtractor 34, the sign and amplitude are preserved.

For small values of e, sin(e) approaches e, and therefore the phase error E approaches −B(Q$^2$/I+I)e. This phase error signal E is then integrated by loop integrator 38, whose output is an automatic frequency control (AFC) voltage fed to the input of voltage controlled oscillator (VCO) 30, to adjust the frequency of the local oscillator reference cos(A+e). Thus, the phase lock loop is completed and e is driven towards zero as desired.

FIG. 1 describes a short loop arrangement. Alternatively, in a long loop arrangement for use when a greater frequency excursion is required, a fixed local oscillator frequency is used, with the AFC controlling the frequency of an additional oscillator in a frequency translation chain which produces the IF signal.

In an alternative embodiment, the phase lock loop may be structured as a phase correction loop, rather than a frequency correction loop, assuming frequency lock is established by other means.

Several ancillary means are required in practice to operate the phase lock loop, for example:

If the frequency uncertainty of the received carrier 1 exceeds the pull-in range of the phase lock loop, a frequency search is necessary. This is performed by search generator 40 which produces a signal that, in conjunction with loop integrator 38, sweeps the AFC over the range of uncertainty. Lock detector 42 (coupled to search generator 40) determines when a lock condition has been achieved, and signals this to lock indicator 44 so that the operator is made aware of lock. At the time of lock, search generator 40 relinquishes its control of loop integrator 38 to subtractor 34.

AGC controller 46 (coupled to lock detector 42) produces the coherent AGC signal that is fed to amplifier 8. Inputs to AGC controller 46 are the absolute values of E, I, and Q, which are obtained from absolute value generators 36, 24, and 14, respectively, as shown in FIG. 1.

In the practical design of a demodulator, the assumptions made in its functioning cannot be realized with total accuracy, resulting in implementation losses which prevent systems from operating at theoretically possible bit error rates. Imperfections which degrade the performance are accumulated in the modulator, input link, and demodulator. Their impact can be assessed by inspecting the above trigonometric equations in the derivation of the phase error E.

The most severe systematic impediment results from I/Q nonsymmetry caused by amplitudes on the transmit side not exactly matching the gain of amplifiers 12,22. As the output of subtractor 34 shows, inaccuracy in the equality of the coefficients of the cosine terms of the signals emanating from amplifiers 12,22 introduces a bias into the performance of the phase lock loop. Sensitivity to this phenomenon is severe, since with the error (sine term and e) going to zero, the cosine difference term becomes the difference of two relatively large values as the cosine goes to one. Unfortunately, the loop cannot compensate for errors apparently created by subtractor 34.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, other techniques for generating the phase error E may be used, and other techniques for extracting the baseband signals from the carrier may be used.

What is claimed is:

1. A demodulator for demodulating an unsymmetrical QPSK signal having I and Q baseband analog signals modulated onto a carrier, comprising:
    means for extracting the I baseband analog signal and the Q baseband analog signal from the carrier;
    coupled to the extracting means, two bit-rate-matched low pass filters for filtering the I and Q baseband analog signals, respectively;
    coupled to the lowpass filter for the channel having the higher modulating bit rate, delay means for time-aligning the two filtered baseband analog signals;
    coupled to the time-aligned filtered baseband analog signals, an I amplifier and a Q amplifier for amplifying the two time-aligned filtered baseband analog signals, respectively, said amplifiers having different gains that are preselected to substantially equalize the amplitudes at the respective amplifier outputs; and
    coupled to the outputs of said two amplifiers, means for generating a phase error, said phase error being coupled to an input of a VCO in a phase lock loop arrangement; wherein
    said VCO has an output that is fed to the extracting means.

2. The demodulator of claim 1 wherein:
    the QPSK signal comprises an I channel and a Q channel;
    the I channel has a higher amplitude and a higher bit rate than the Q channel;
    the absolute value of the amplitude of the I channel is I;
    the absolute value of the amplitude of the Q channel is Q;
    the Q channel amplifier has a gain of B; and
    the I channel amplifier has a gain of BQ/I.

3. The demodulator of claim 1 wherein the extracting means comprises:
    coupled to the QPSK signal, an in-phase power divider which produces first and second replicas of the QPSK signal;
    coupled to the VCO output, a quadrature power divider which outputs first and second local oscillator reference signals 90° out of phase with respect to each other;

a first multiplier having as inputs the first replica and the first local oscillator reference signal, and having an output coupled to the low pass filter that operates on the I baseband analog signal; and a second multiplier having as inputs the second replica and the second local oscillator reference signal, and having an ouput coupled to the low pass filter that operates on the Q baseband analog signal.

4. The demodulator of claim 1 wherein the phase error generating means comprises:

a pair of sign detectors coupled to the amplified time-aligned filtered baseband analog signals, respectively;

a pair of multipliers coupled to respective outputs of the sign detectors and to opposing ones of the amplified time-aligned filtered baseband analog signals;

a subtractor having as its two inputs the outputs of the two multipliers;

a loop integrator having an input coupled to an output of the subtractor; and said VCO having an input coupled to an output of the loop integrator and an output coupled to the extracting means.

5. The demodulator of claim 1 further comprising: frequency searching means coupled to the phase error generating means;

a lock detector coupled to the frequency searching means for deciding when the QPSK signal has been discovered; and an automatic gain controller having a first output coupled to the lock detector and a second output coupled to an amplifier inserted in the path of the QPSK signal before said signal enters the extracting means.

* * * * *